US008018619B2

(12) United States Patent
Yamamoto et al.

(10) Patent No.: US 8,018,619 B2
(45) Date of Patent: Sep. 13, 2011

(54) SIMULATION OF PRINT VIA A NETWORK (75) Inventors: Yuko Yamamoto, Nagano-ken (JP); Yoshifumi Arai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 11/354,733

(22) Filed: Feb. 14, 2006

(65) Prior Publication Data
US 2006/0192996 A1 Aug. 31, 2006

(30) Foreign Application Priority Data
Feb. 16, 2005 (JP) .................................. 2005-38768

(51) Int. Cl.
*G06F 15/00* (2006.01)

(52) U.S. Cl. ........ 358/1.9; 358/1.15; 358/508; 358/515; 358/518; 358/523; 382/162; 382/167; 348/222.1; 348/223.1; 348/333.02

(58) Field of Classification Search .................... 358/1.9, 358/1.15; 382/162, 167
See application file for complete search history.

(56) References Cited

U.S. PATENT DOCUMENTS

| | | | | |
|---|---|---|---|---|
| 5,739,928 A * | 4/1998 | Scott | ............................ | 358/520 |
| 6,377,355 B1 * | 4/2002 | Kumada | ........................ | 358/1.12 |
| 6,980,231 B1 * | 12/2005 | Ohsawa | ........................ | 348/188 |
| 7,024,055 B2 * | 4/2006 | Newman | ........................ | 382/305 |
| 7,079,282 B2 * | 7/2006 | Nagatani | ........................ | 358/1.9 |
| 7,079,284 B2 * | 7/2006 | Kawakami et al. | ............ | 358/1.9 |
| 7,158,144 B2 | 1/2007 | Shiraiwa et al. | | |
| 7,230,642 B2 * | 6/2007 | Iida et al. | .................... | 348/222.1 |
| 7,327,384 B2 * | 2/2008 | Ivers | ............................. | 348/184 |
| 7,366,350 B2 * | 4/2008 | Kajihara | ....................... | 382/167 |
| 2003/0142377 A1 * | 7/2003 | Yamada et al. | ............... | 358/521 |
| 2003/0151756 A1 * | 8/2003 | Yamazaki et al. | ............. | 358/1.9 |
| 2003/0234880 A1 * | 12/2003 | Fukui | ............................ | 348/272 |
| 2004/0174548 A1 * | 9/2004 | Ono | ............................... | 358/1.9 |
| 2004/0212546 A1 * | 10/2004 | Dixon et al. | .................. | 345/1.1 |
| 2005/0200866 A1 * | 9/2005 | Hoshii et al. | ................... | 358/1.9 |

(Continued)

FOREIGN PATENT DOCUMENTS
EP 1231776 A1 * 8/2002
(Continued)

OTHER PUBLICATIONS

Y. Ohya, T. Obi, M. Yamaguchi, N. Ohyama, K. Ishii, Y. Komiya, Natural Color Reproduction System for Telemedicine, Aug. 1998, Medical Technology Symposium, Proceedings Pacific, pp. 442-449.*

(Continued)

*Primary Examiner* — Sudhanshu C Pathak
*Assistant Examiner* — Miya J Cato
(74) *Attorney, Agent, or Firm* — Martine Penilla & Gencarcella, LLP (57) ABSTRACT A server receives simulation condition input from a client computer, and in accordance with the simulation condition input creates display-use data indicating the result of the simulation, and sends the display-use data to the client. The print simulator of the server first converts the image data to ink quantities, and then converts the ink quantities to spectral reflectance of the print. Then, using the spectral reflectance of the print together with the print observation condition and the display device observation condition, there is created display-use data for simulating the appearance of the print under the print observation condition, under the display device observation condition.

2 Claims, 5 Drawing Sheets

U.S. PATENT DOCUMENTS

2005/0275911 A1* 12/2005 Yamada et al. ............... 358/518

FOREIGN PATENT DOCUMENTS

| JP | 07-095424 | 4/1995 |
| --- | --- | --- |
| JP | 07-095425 | 4/1995 |
| JP | 07-095426 | 4/1995 |
| JP | 09-046535 | 2/1997 |
| JP | 09-233352 | 9/1997 |
| JP | 10-243247 | 9/1998 |
| JP | 11-041478 | 2/1999 |

OTHER PUBLICATIONS

S. Abert, G. Marcu, A Neural Network Approach for RGB to YMCK color conversion, Aug. 1994, TENCON IEEE Region Annual International Conference, vol. 1, pp. 6-9.*

Abstract of Japanese Patent Publication No. 07-095424, Pub. Date: Apr. 7, 1995, Patent Abstracts of Japan.

Abstract of Japanese Patent Publication No. 07-095425, Pub. Date: Apr. 7, 1995, Patent Abstracts of Japan.

Abstract of Japanese Patent Publication No. 07-095426, Pub. Date: Apr. 7, 1995, Patent Abstracts of Japan.

Abstract of Japanese Patent Publication No. 09-046535, Pub. Date: Feb. 14, 1997, Patent Abstracts of Japan.

Abstract of Japanese Patent Publication No. 09-233352, Pub. Date: Sep. 5, 1997, Patent Abstracts of Japan.

Abstract of Japanese Patent Publication No. 10-243247, Pub. Date: Sep. 11, 1998, Patent Abstracts of Japan.

Abstract of Japanese Patent Publication No. 11-041478, Pub. Date: Feb. 12, 1999, Patent Abstracts of Japan.

* cited by examiner

SIMULATION OF PRINT VIA A NETWORK

CROSS REFERENCE TO RELATED APPLICATIONS

The present application claims the priority based on Japanese Patent Application No. 2005-38768 filed on Feb. 16, 2005, the disclosure of which is hereby incorporated by reference in its entirety.

BACKGROUND OF THE INVENTION

1. Field of the Invention

The present invention relates to technology for simulating the appearance of print under multiple observation conditions.

2. Description of the Related Art

As is well known, the appearance of print depends greatly upon the observation conditions (also termed "observation environment"). To date, various technologies have been developed for carrying out color matching under different observation conditions. For example, JPA7-95424, JPA7-95425, and JPA7-95426 disclose technologies for color matching in the case of different light sources.

There has also existed a need to be able to verify the appearance of print on a monitor. For example, technology known as digital proofing, which allows the appearance of print under a standard observation condition to be displayed on color monitors, is known. However, in the past it has proven difficult to reproduce on a monitor the appearance of print under various observation conditions.

SUMMARY OF THE INVENTION

An object of the present invention is to provide technology whereby the appearance of print under various observation conditions can be reproduced on a monitor.

According to one aspect of the present invention, there is provided a server for providing data representing appearance of a print to a client computer over a network. The server comprises: a receiving module for receiving input of a simulation condition from the client computer; a print simulator that, for a print which is to be printed according to image data representing an image and to be observed under a first observation condition, creates display-use data for reproducing under a second observation condition of a display device the appearance of the print under the first observation condition; and a transmitting module for transmitting the display-use data to the client computer. The print simulator includes: a condition setting module for acquiring first and second observation condition parameters representing the first and second observation conditions, based on the simulation condition input from the client computer; a color conversion module for converting the image data to ink quantities; a spectral reflectance conversion module for converting the ink quantities to spectral reflectance of the print; and an observation condition conversion module that, using the spectral reflectance of the print and the first and second observation condition parameters, creates the display-use data for use in reproducing under the second observation condition of the display device the appearance of the print under the first observation condition.

With this arrangement, ink quantities are converted to spectral reflectance of the print, and display-use data is created using this spectral reflectance, the observation condition parameter for the print, and the observation condition parameter for the monitor, whereby the appearance of the print under various observation conditions can be reproduced on the monitor of the client computer.

The present invention can be reduced to practice in various embodiments, for example, a method and a server for providing a print simulation service; a network system including a server and a client; a method and a device for carrying out print simulation; a computer program for realizing the functions of such a method or device; a recording medium having such a computer program recorded thereon; a data signal containing such a computer program and embodied in a carrier wave; and so on.

These and other objects, features, aspects, and advantages of the present invention will become more apparent from the following detailed description of the preferred embodiments with the accompanying drawings.

DESCRIPTION OF THE PREFERRED EMBODIMENT

The embodiments of the invention will be described hereinbelow in the following order.
A. Embodiment:
B. Modification Examples:

A. EMBODIMENT

Figure 1:
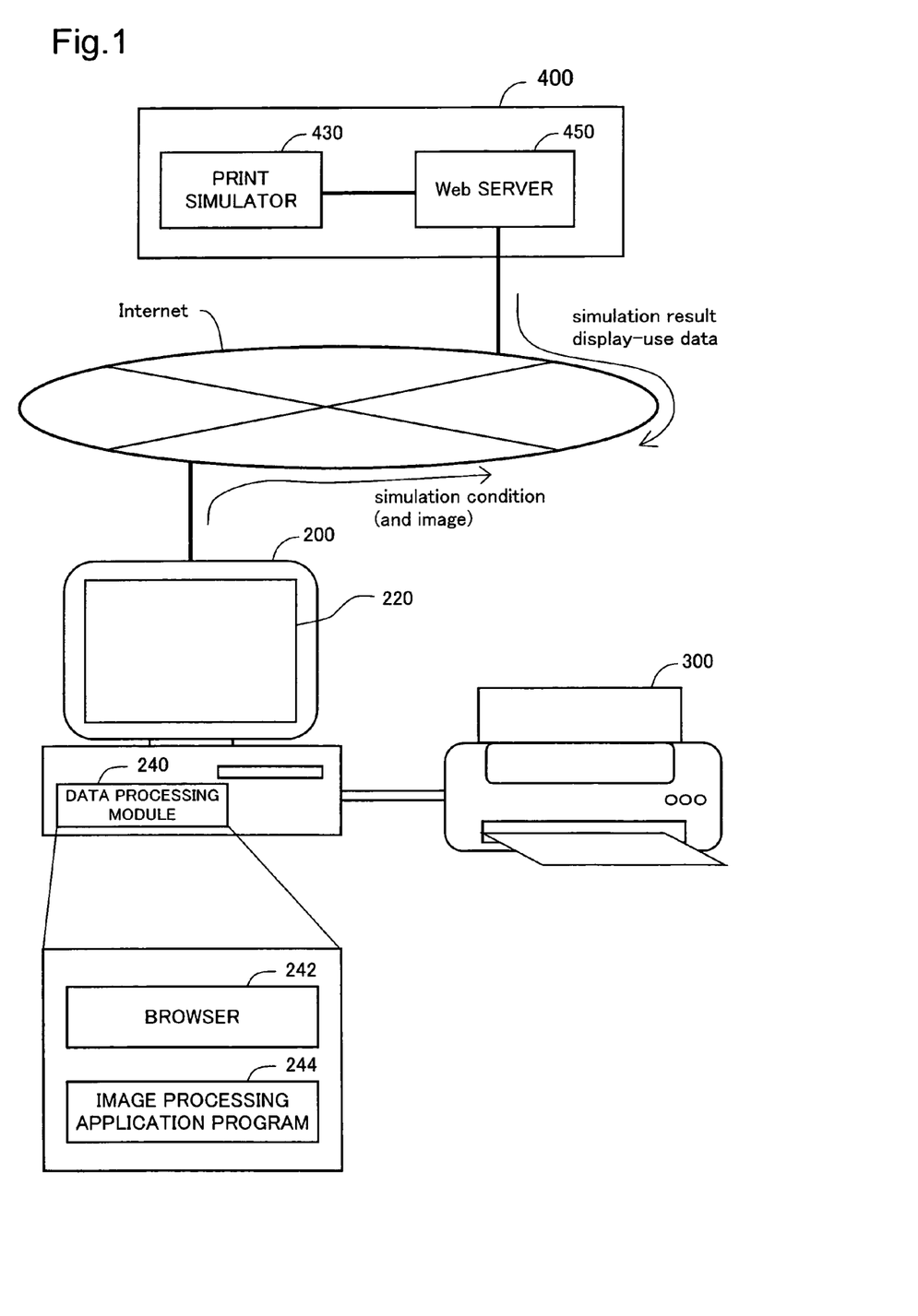
FIG. 1 illustrates the network system as an embodiment of the present invention.

FIG. 1 illustrates the overall configuration of the network system in an embodiment of the invention. This system is composed of a server system 400 and a client computer 200 connected via the Internet. The client computer 200 is connected to a color printer 300. The color printer 300 may be omitted.

The server system 400 comprises two servers, namely, a print simulator 430 and a Web server 450. These two servers 430, 450 may be realized on separate computer hardware, or on the same computer hardware. Services by the two servers 430, 450 may be provided by a single server as well.

This server system 400 stores various files and program modules for the purpose of providing print simulation service via the Internet. For example, the Web server 450 stores various Web pages, including a home page for the print simulation service. The Web server 450 functions as a transmitting/receiving module for exchanging data of various kinds with the client computer 200.

The print simulator 430, in accordance with simulation condition input provided by the client computer 200, creates display-use data for reproducing, under the observation condition of the monitor 220 or display device of the client computer 200, the appearance of print when the print is observed under various observation conditions.

In the data processing module 240 of the client computer 200 are installed a browser 242 and an image processing application program 244. However, it suffices that a browser 242 for accessing the server system 400 be installed on the client computer 200.

Figure 2:
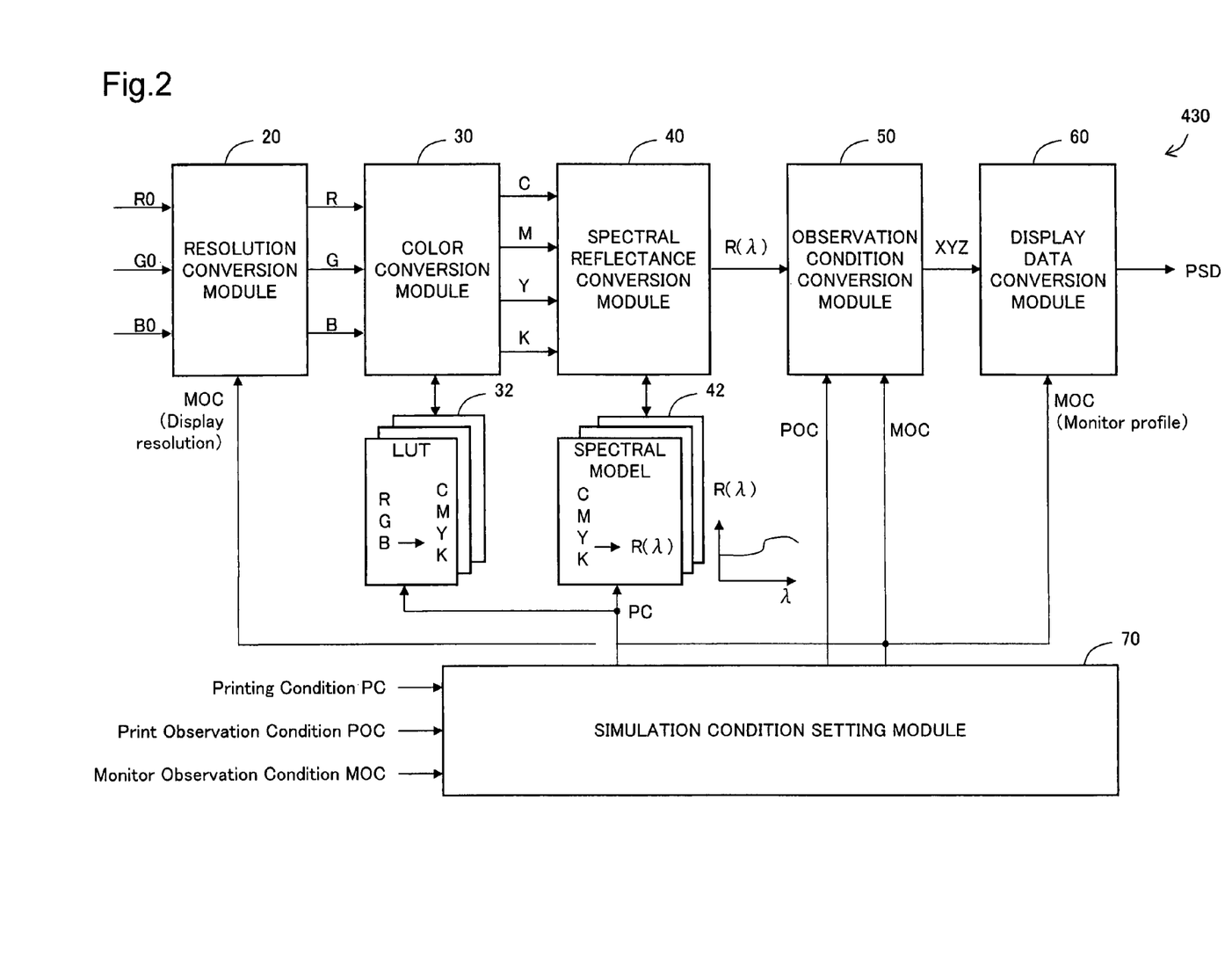
FIG. 2 is a block diagram of the internal arrangement of the print simulator in the embodiment.

FIG. 2 is a block diagram of the internal arrangement of the print simulator 430 in the embodiment. The print simulator 430 comprises a resolution conversion module 20, a color conversion module 30, a spectral reflectance conversion module 40, an observation condition conversion module 50, a display data conversion module 60, and a simulation condition setting module 70.

The resolution conversion module 20 has the function of converting the resolution (pixel count×number of lines) of input color image data R0, G0, B0 to the display resolution (pixel count×number of lines) of the monitor 220. The resolution conversion process is performed for the purpose of speeding up subsequent processing, and the resolution conversion process may be omitted.

The color conversion module 30 converts the resolution-converted color image data RGB into ink quantity data CMYK using color conversion lookup tables 32. In this embodiment, the color printer used to print the print being simulated is assumed to be one that uses the four ink colors CMYK. Typically, the color conversion module 30 has the function of conversion to ink quantities of the plurality of inks useable in the color printer which will be used to print the print being simulated. A plurality of tables prepared depending on a plurality of printing conditions may be used as the color conversion lookup tables 32. The print simulation can be carried out for the printer 300 that is connected to the client computer 300, or for an unconnected printer model that is not connected to the client computer 300.

The spectral reflectance conversion module 40 converts the ink quantity data CMYK to spectral reflectance $R(\lambda)$. Spectral reflectance $R(\lambda)$ is the spectral distribution of reflectance of a print which is to be printed with the ink quantities CMYK ejected onto a prescribed printing medium. Relationships between ink quantities CMYK and spectral reflectance $R(\lambda)$ are determined based on measured values of spectral reflectance for large numbers of color patches and stored in a spectral model lookup table 42. The spectral model lookup table 42 can be created in accordance with known spectral models such as the Yule-Nielsen Spectral Neugebauer Model or the Cellular Yule-Nielsen Spectral Neugebauer Model. The Cellular Yule-Nielsen Spectral Neugebauer Model divides the ink color space of the Yule-Nielsen Spectral Neugebauer Model into multiple cells. The Cellular Yule-Nielsen Spectral Neugebauer Model is described in Wyble and Berns, Color Res. Appl., 25, 4-19, 2000. Since spectral reflectance $R(\lambda)$ is dependent on printing conditions, it is preferable that a plurality of tables corresponding to a plurality of different printing conditions are prepared as the spectral model lookup tables 42.

A single color conversion lookup table 32 and a single spectral model lookup table 42 are selected for use in print simulation, depending on the printing conditions PC acquired by the simulation condition setting module 70.

From the spectral reflectance $R(\lambda)$ of the print, the observation condition conversion module 50 creates display-use color specification values XYZ for reproducing the appearance of the print under the observation condition of the monitor 220. In this process, the print observation condition POC and monitor observation condition MOC acquired by the simulation condition setting module 70 are used. In preferred practice, the observation condition conversion module 50 executes the process in accordance with a pre-established color appearance model. In the embodiment, CIECAM02 is used as the color appearance model. Processing by the observation condition conversion module 50 will be discussed in detail later.

The display data conversion module 60 converts the display-use color specification values XYZ derived by the observation condition conversion module 50 into print simulation data PSD, which is display data suited to the monitor 220. For this conversion, a monitor profile that indicates correspondence relationships between tristimulus values XYZ and the color space of the monitor 220 is used. It is possible for processing by the display data conversion module 60 to be accomplished utilizing a color management function installed on the client computer 200. In this case, the display data conversion module 60 can be omitted from the print simulator 430. Processing by the display data conversion module 60 may also be executed in the observation condition conversion module 50.

The display-use color specification values XYZ and the print simulation data PSD are both "display-use data" to be used in displaying the print simulation image on the monitor 220. The print simulator 430 may be designed so that, of these sets of display-use data, only display-use color specification values XYZ are created; or designed so that both display-use color specification values XYZ and print simulation data PSD are created.

Figure 3:
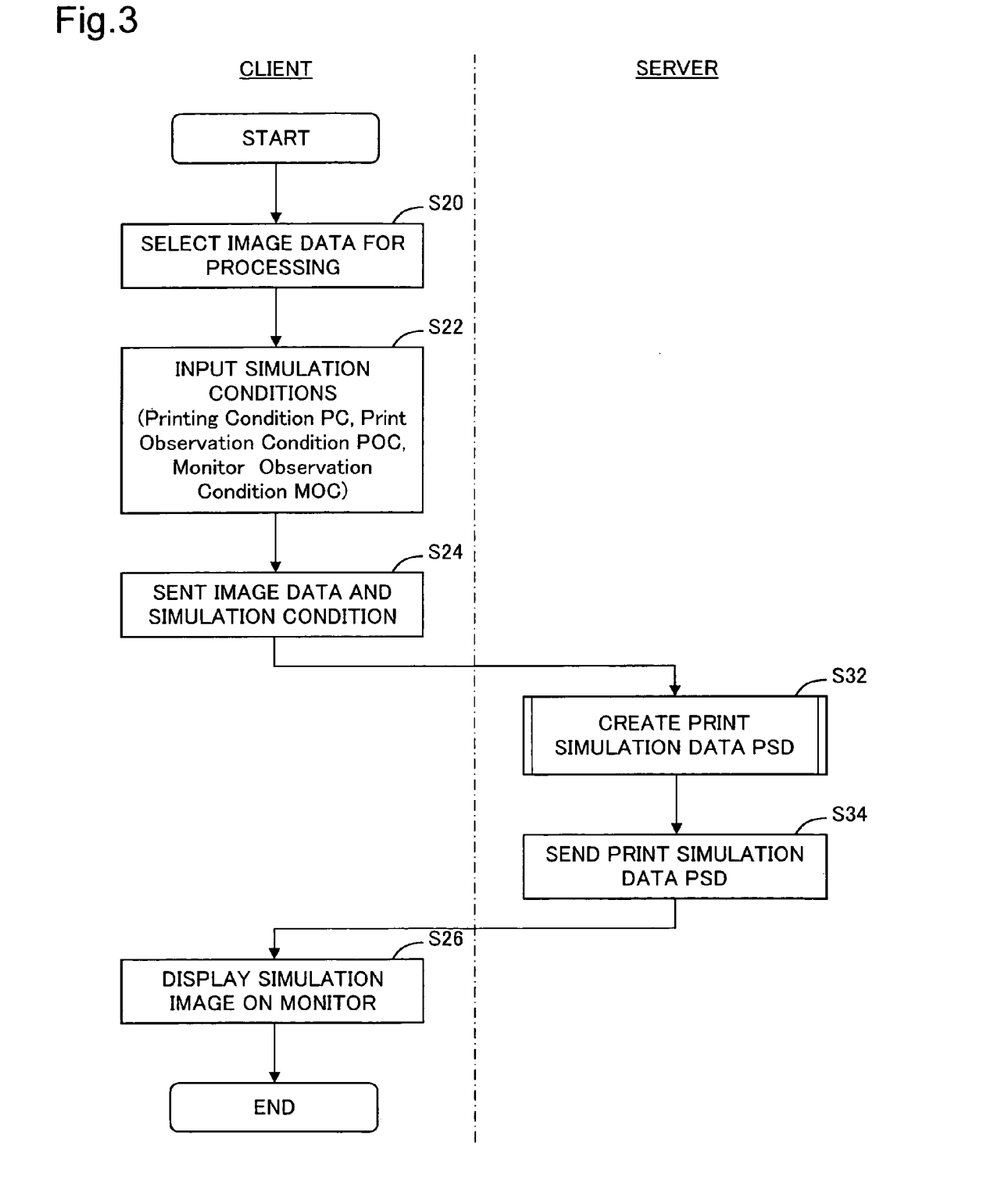
FIG. 3 is a flowchart depicting the overall sequence of processes in the embodiment.

FIG. 3 is a flowchart depicting the overall sequence of processes in the embodiment. In Step S20, the user of the client computer 200 selects image data for processing. Typically, image data for a photograph or other natural image will be selected for processing. However, simulation may be carried out using a predetermined standard image as the image for processing. In this case, image selection by the user will not be necessary.

In Step S22, the user inputs the various simulation conditions. Simulation conditions include the printing condition PC, the print observation condition POC, and monitor observation condition MOC.

In preferred practice, the printing condition PC will include the following parameters.

(PC-1) Printer model
(PC-2) Print medium
(PC-3) Printing mode (print resolution, unidirectional/bi-directional printing, etc.)

Where the printer model is selectable, it is possible to reproduce on the monitor 220 the appearance of a print made with a printer that the user does not currently have. Where the printer model is determined, among the other printing condition parameters, those considered to have the greatest effect on print appearance are the print medium and the print resolution. Accordingly, in preferred practice, at least print medium and print resolution will be included among the parameters for specifying the printing condition PC.

Where CIECAM02 is used as the color appearance model, in preferred practice the print observation condition POC will include the following parameters (print observation condition parameters).

(POC-1) Spectral distribution of light source of print observation environment $P(\lambda)$
(POC-2) White tristimulus values of print observation environment Xw, Yw, Zw
(POC-3) Adapted field luminance of print observation environment $L_A$
(POC-4) Background luminance of print observation environment Yb
(POC-5) Surround ratio of print observation environment $S_R$ (or three parameter values c, Nc, and F determined from $S_R$)

Similarly, in preferred practice the monitor observation condition MOC will include the following parameters (monitor observation condition parameters).

(MOC-1) Monitor model (display resolution, monitor profile)

(MOC-2) White tristimulus values of monitor observation environment Xw, Yw, Zw (MOC-3) Adapted field luminance of monitor observation environment $L_A$ (MOC-4) Background luminance of monitor observation environment Yb (MOC-5) Surround ratio of monitor observation environment $S_R$ (or three parameter values c, Nc, and F determined from $S_R$)

The light source spectral distribution P(λ) is used when the observation condition conversion module 50 calculates tristimulus values XYZ under the print observation condition, from the print spectral reflectance R(λ). The display resolution, which is determined from the monitor model, is utilized by the resolution conversion module 20; and the monitor profile is utilized by the display data conversion module 60. The other print observation condition parameters and monitor observation condition parameters are used by the observation condition conversion module 50 when carrying out conversion in accordance with the color appearance model such as CIECAM02. The specifics of CIECAM02 and the aforementioned parameters Xw, Yw, Zw, $L_A$, Yb, $S_R$, c, Nc, F are described in detail in the technical report CIE 159: 2004 (CIECAM02) by the International Commission on Illumination.

The white tristimulus values of the print observation environment Xw, Yw, Zw can be computed from the spectrum P(λ) of the light source or illuminant. Accordingly, input of white tristimulus values of the print observation environment Xw, Yw, Zw can be omitted. Also, the spectrum of the light source of the monitor observation environment could be input instead of the white tristimulus values of the monitor observation environment Xw, Yw, Zw.

Typically, the types of parameters included in the print observation condition POC and the monitor observation condition MOC will be determined depending on the model used by the observation condition conversion module 50, and it is possible to include parameters other than the parameters mentioned above. In preferred practice, however, the print observation condition POC and the monitor observation condition MOC will each include at least light source information indicating the light source. The reason is that different light sources have the greatest effect on print appearance.

Of all of the parameters used by the observation condition conversion module 50, it is possible that only some of the parameters are required to be input by the user. For example, the simulation condition setting module 70 can be designed so that the user inputs only the light source name indicating the light source of the print observation condition (e.g. standard illuminant D65, D50, F11 etc.), or to input only the light source name of the print observation condition and the light source name of the monitor observation condition, with predetermined default values being used for the other parameters. As will be apparent from this example, the term "acquiring" each kind of condition by the simulation condition setting module 70 refers to determining each kind of condition on the basis of simulation condition input by the user.

Where the user is able to input multiple kinds of observation conditions as print observation conditions (e.g., multiple types of light source), it becomes possible to reproduce on the monitor the appearance of print under various print observation conditions. For example, where a standard illuminant type (light source name) or an arbitrary light source spectral distribution can be input, there is the advantage that print appearance under various light sources can be simulated on the monitor 220.

In the embodiment, it is assumed that, for example, the user inputs light source information indicating an arbitrary light source in the print observation condition, and the print simulator 430 carries out simulation according to this light source information. As noted, the light source name alone, or the light source spectral distribution per se, may be input by way of the light source information.

In Step S24 of FIG. 3, the image for processing and the simulation condition input are sent from the client computer 200 to the server system 400. This transmission is initiated, for example, when the user clicks a Send command button displayed in the browser. Where a predetermined standard image is being used as the image data, the step of sending the image data may be omitted.

In Step S32, the print simulator 430 creates print simulation data PSD on the basis of the image data and the simulation condition. In Step S34, this print simulation data PSD is sent from the server system 400 to the client computer 200. In Step S26, an image of the print is displayed on the monitor 220 (FIG. 1) of the client computer 200, in accordance with this print simulation data PSD.

Figure 4:
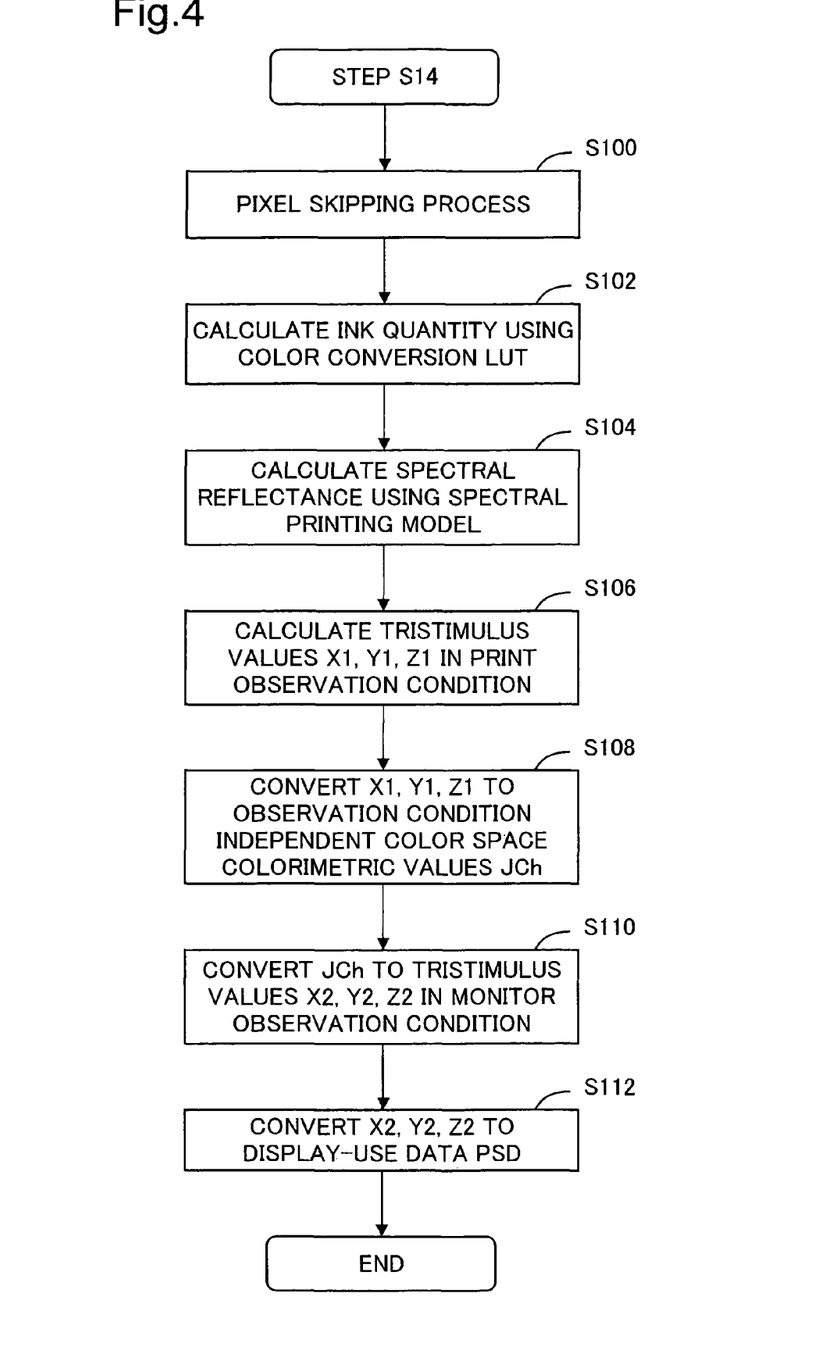
FIG. 4 is a flowchart depicting in detail the procedure of Step S32 of FIG. 3.

FIG. 4 is a flowchart depicting in detail the procedure of Step S32 of FIG. 3. The process of FIG. 4 is executed for each pixel of the simulation image displayed on the monitor 220.

In Step S100, the resolution conversion module 20 executes the resolution conversion process if needed. Where the image data resolution (pixel count×number of lines) is low, the resolution conversion process may be omitted. In Step S102, the color conversion module 30, using the color conversion lookup table 32 selected according to the printing condition PC, converts the image data RGB to ink quantity data CMYK. In Step S104, the spectral reflectance conversion module 40, using the spectral model lookup table 42 selected according to the printing condition PC, converts the ink quantity data CMYK to spectral reflectance R(λ) of the print.

Steps S106-S110 are executed by the observation condition conversion module 50. First, in Step S106, using the print spectral reflectance R(λ) and the print observation condition POC, the tristimulus values X1, Y1, Z1 for the print under the print observation condition are calculated. At this time, the light source spectral distribution P(λ) from the print observation condition POC is used. These tristimulus values X1, Y1, Z1 are color specification values representing color appearance under the print observation condition.

In Step S108, using the so-called forward model of CIECAM02, these color specification values X1, Y1, Z1 are converted to color specification values JCh which are defined in the observation condition independent color space. Here, J represents lightness, C represents chroma (saturation), and h represents hue angle. In the forward model of CIECAM02, since other values besides these (achromatic response A, brightness Q, colorfulness M, saturation s, and the like) can be obtained, it is possible to use values other than J, C, h. The color specification values JCh of the observation condition independent color space represent color appearance that is not dependent on observation condition. Here, these color specification values JCh are also called "observation condition independent color specification values."

In Step S110, using the so-called inverse model of CIECAM02, the observation condition independent color specification values JCh are converted to monitor observation condition color specification values X2, Y2, Z2. These color specification values X2, Y2, Z2 represent color appearance under the monitor observation condition, and are also referred to hereinbelow as "display-use color specification values." By means of conversion in Steps S108 and S110, it is possible to compensate for difference in color appearance due to differences between the print observation condition and the monitor observation condition. CIECAM02 takes into consideration the effect of chromatic adaptation, and the effect of the ratio of visual field brightness and the background brightness ($=S_R$).

In Step S112, the display data conversion module 60 converts the display-use color specification values X2, Y2, Z2 to print simulation data PSD, which is display-use data suitable for display on the monitor 220. Typically, sRGB is the color system suitable for display on the monitor 220, and there are instances in which color represented by the color specification values X2, Y2, Z2 falls outside of the color gamut reproducible with the sRGB color system (the so-called monitor color system gamut). In such instances, in Step S112, display-use color specification values X2, Y2, Z2 representing color outside the monitor color system gamut will be mapped to colors inside the monitor color system gamut.

Figure 5:
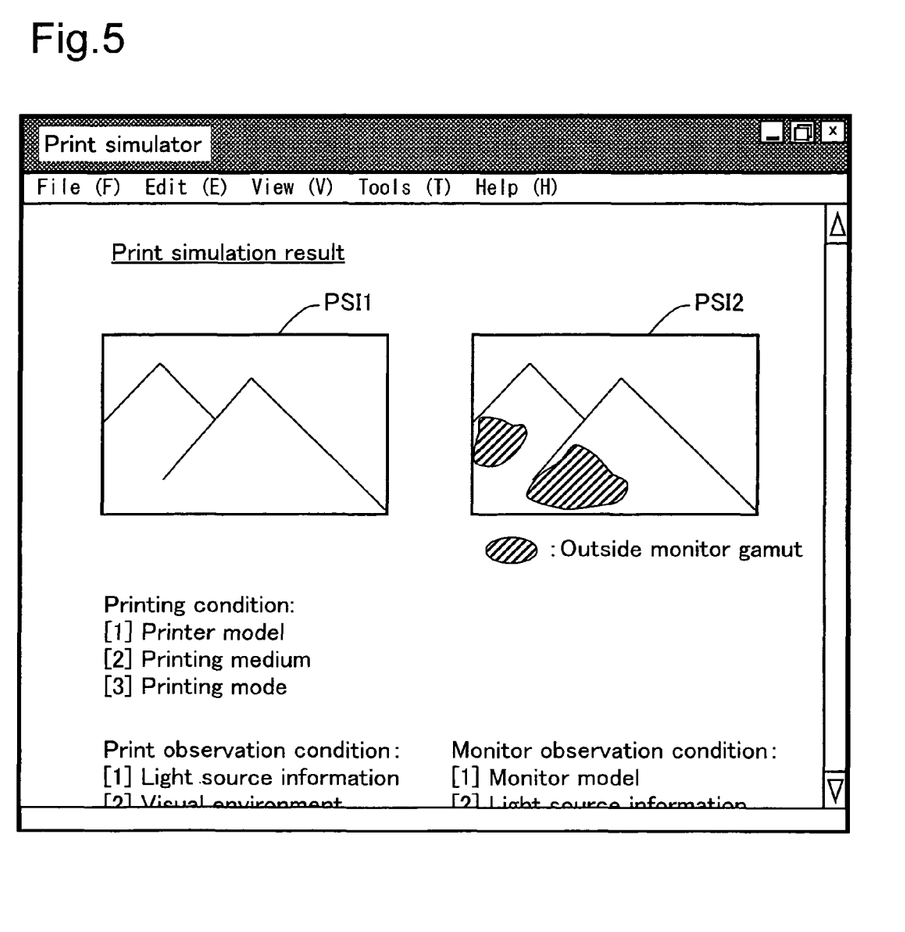
FIG. 5 illustrates the result of print simulation displayed on the monitor.

FIG. 5 is an illustration depicting the result of print simulation displayed on the monitor. In this example, two simulation images PSI1 and PSI2 are displayed as the result of print simulation, and simulation conditions are displayed therebelow.

The simulation image PSI1 is an image displayed with colors that are all within the gamut of the monitor color system. The simulation image PSI2 is an image in which color lying outside the gamut of the monitor color system has been covered over with a specific color (e.g. black). Below the image PSI2, there is displayed text indicating that the areas of the specific color are "portions not reproducible on the monitor." In this way, pixels outside the gamut of the monitor can be displayed in a manner distinguishing them from pixels in the gamut, so that the user can more accurately ascertain the appearance of the print.

It is also possible to enable selective display of either the first or second simulation image PSI1, PSI2 in response to an instruction by the user. It is also possible to enable switching between display of the first and second simulation images PSI1, PSI2 in response to an instruction by the user.

It is also possible to have an arrangement whereby when multiple light sources have been specified by the user, multiple simulation images under the different light sources are displayed simultaneously on the screen of the monitor 220. With this arrangement, direct comparison of the appearance of print under a number of light sources is possible. Accordingly, when purchasing a new light source for example, the user could refer to the print simulation for deciding which light source to purchase.

It is also possible to have an arrangement whereby, for example, in the event that the user has specified multiple printer models, multiple simulation images corresponding to the different printer models are displayed simultaneously on the screen of the monitor 220.

As will be apparent from these examples as well, where the simulation service is executed while setting a plurality of different models of the same type of device as simulation condition input, it is possible for the user to compare the difference in print appearance with different models.

The print simulation service described above may be provided for a fee, or provided free.

According to the embodiment, color specification values X1, Y1, Z1 under the print observation condition are converted to display-use color specification values X2, Y2, Z2 under the monitor observation condition, and on the basis of these display-use color specification values X2, Y2, Z2 there is displayed on the monitor 220 an image that simulates the print. Accordingly, it becomes possible to verify print appearance on the monitor, without actually printing a printout. When deriving the color specification values X1, Y1, Z1 under the print observation condition, print ink quantities are converted to spectral reflectance $R(\lambda)$; and using this spectral reflectance $R(\lambda)$ together with the spectral distribution of the light source, the color specification values X1, Y1, Z1 are calculated, whereby it is possible to reproduce on the monitor the appearance of print under any of various light sources.

B. MODIFICATION EXAMPLES

The invention is not limited to the embodiment described hereinabove, and may be reduced to practice in various other forms without departing from the spirit thereof, such as the following modification examples.

B1. Modification Example 1

It is possible to use any model besides CIECAM02 as the color appearance model; for example, it would be possible to use CIECAM97s, or a model that considers only chromatic adaptation such as the von Kries chromatic adaptation estimation equation. However, it is preferable that the color appearance model is able to compensate for difference in chromatic adaptation between the print observation condition and the monitor observation condition.

B2. Modification Example 2

In the embodiment hereinabove, tristimulus values XYZ were utilized as the observation condition-dependent color specification values, but color specification values other than the tristimulus values may be used instead.

B3. Modification Example 3

The printing method targeted for simulation may be printing with an ink-jet printer or printing with a laser printer; printing by means of offset printing can be targeted as well. Where the printing method targeted for simulation is changed, color conversion lookup tables 32 and spectral model lookup tables 42 suitable for the printing method will be prepared accordingly.

B4. Modification Example 4

In the embodiment hereinabove, some of the arrangements realized through hardware could instead be substituted by software; and conversely some of the arrangements realized through software could instead be substituted by hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A server for providing data representing appearance of a print to a client computer over a network, comprising:
 a receiving module for receiving input of a simulation condition from the client computer;
 a print simulator that, for a print which is to be printed according to image data representing an image and to be observed under a first observation condition, creates display-use data for reproducing under a second observation condition of a monitor of the client computer the appearance of the print under the first observation condition; and a transmitting module for transmitting the display-use data to the client computer;

wherein the print simulator includes:

a condition setting module for acquiring first and second observation condition parameters representing the first and second observation conditions, based on the simulation condition input from the client computer;

a color conversion module for converting the image data to ink quantities;

a spectral reflectance conversion module for converting the ink quantities to spectral reflectance $R(\lambda)$ of the print, wherein the spectral reflectance $R(\lambda)$ is spectral distribution of reflectance of a print which is to be printed with the ink quantities; and an observation condition conversion module that, using the spectral reflectance of the print and the first and second observation condition parameters, creates the display-use data for use in reproducing under the second observation condition of the monitor the appearance of the print under the first observation condition, wherein the color conversion module is able to utilize a plurality of color conversion lookup tables corresponding to a plurality of printing conditions, and selects for use a single color conversion lookup table depending on the printing condition of the print, the spectral reflectance conversion module is able to utilize a plurality of spectral model lookup tables corresponding to the plurality of printing conditions, and selects for use a single spectral model lookup table depending on the printing condition of the print, the print simulator creates a first display-use data representing a first simulation image with in-gamut colors that are all within a gamut of a monitor color system of the monitor, and a second display-use data representing a second simulation image in which all out-of-gamut colors lying outside the gamut of the monitor color system have been converted to a specific color, the transmitting module transmits the plurality of the display-use data to the monitor of the client computer to simultaneously display the plurality of simulation images side-by-side or to alternately display the plurality of simulation images, and in the event that a user of the client computer has specified multiple different printer models, multiple simulation images corresponding to the different printer models are displayed simultaneously on the monitor.

2. A method, under control of a server, for providing data representing appearance of a print to a client computer over a network, comprising the steps of:

receiving input of a simulation condition from the client computer;

creating, for a print which is to be printed according to image data representing an image and to be observed under a first observation condition, display-use data for reproducing under a second observation condition of a monitor of the client computer the appearance of the print under the first observation condition; and transmitting the display-use data to the client computer;

wherein the step of creating display-use data includes the steps of:

(a) acquiring first and second observation condition parameters representing the first and second observation conditions, based on the simulation condition input from the client computer;

(b) converting the image data to ink quantities;

(c) converting the ink quantities to spectral reflectance $R(\lambda)$ of the print, wherein the spectral reflectance $R(\lambda)$ is spectral distribution of reflectance of a print which is to be printed with the ink quantities; and (d) creating, using the spectral reflectance of the print and the first and second observation condition parameters, the display-use data for use in reproducing under the second observation condition of the monitor the appearance of the print under the first observation condition, wherein the step (b) includes:

providing a plurality of color conversion lookup tables corresponding to a plurality of printing conditions, and selecting for use a single color conversion lookup table depending on the printing condition of the print, the step (c) includes:

providing a plurality of spectral model lookup tables corresponding to the plurality of printing conditions, and selecting for use a single spectral model lookup table depending on the printing condition of the print, the step (d) includes creating a first display-use data representing a first simulation image with in-gamut colors that are all within a gamut of a monitor color system of the monitor, and a second display-use data representing a second simulation image in which all out-of-gamut colors lying outside the gamut of the monitor color system have been converted to a specific color, the step of transmitting the display-use data includes transmitting the plurality of the display-use data to the monitor of the client computer to simultaneously display the plurality of simulation images side-by-side or to alternately display the plurality of simulation images, and in the event that a user of the client computer has specified multiple different printer models, multiple simulation images corresponding to the different printer models are displayed simultaneously on the monitor.

* * * * *